United States Patent [19]

Roberts et al.

[11] 3,850,483

[45] Nov. 26, 1974

[54] PERMANENT ASSEMBLIES INCLUDING THERMOPLASTIC COMPONENTS AND METHOD OF ASSEMBLY

[75] Inventors: Maurice Roberts; David Peasley, both of Tyseley, England

[73] Assignee: Girling Limited, Birmingham, England

[22] Filed: June 30, 1972

[21] Appl. No.: 269,287

[30] Foreign Application Priority Data
July 2, 1971  Great Britain.................... 31175/71

[52] U.S. Cl..................... 308/4 R, 92/168, 308/3.5
[51] Int. Cl............................................ F16j 15/18
[58] Field of Search............. 308/4 R, 3.5; 277/205, 277/58; 92/165, 168

[56] References Cited
UNITED STATES PATENTS

| | | | |
|---|---|---|---|
| 2,639,198 | 5/1953 | Kirkham | 308/4 R |
| 2,690,939 | 10/1954 | Wheley | 277/58 |
| 3,390,890 | 7/1968 | Kurtz | 277/205 |
| 3,554,569 | 1/1971 | Gorman | 277/205 |

FOREIGN PATENTS OR APPLICATIONS

| | | | |
|---|---|---|---|
| 1,196,448 | 11/1959 | France | 308/4 |

*Primary Examiner*—Charles J. Myhre
*Assistant Examiner*—R. H. Lazarus
*Attorney, Agent, or Firm*—Scrivener Parker Scrivener and Clarke

[57] ABSTRACT

A piston rod guide and seal assembly comprises an annular thermoplastics piston rod guide which is formed with an internal recess receiving an elastomeric annular seal which is permanently locked in position by an inwardly deformed annular portion of the rod guide adjacent the seal. The inner end of the seal may be restrained by an axially outwardly directed spigot formed radially inwardly of and adjacent a shoulder at the inner end of the recess. The assembly is formed using a special-purpose tool by applying ultrasonic energy and mechanical pressure to a portion of the rod guide to soften the portion and upset it into clamping relationship with the other element. The tool comprises an ultrasonic probe having an annular groove for cooperation with the rod portion, and a skirt extending around the periphery of the groove.

4 Claims, 5 Drawing Figures

PERMANENT ASSEMBLIES INCLUDING THERMOPLASTIC COMPONENTS AND METHOD OF ASSEMBLY

This invention relates to permanent assemblies comprising a thermoplastics element and another element, and to a tool and to a method of forming such assemblies.

Although the invention is not limited thereto, it is particularly applicable to a piston-rod guide assembly for hydraulic or pneumatic piston and cylinder units, such as hydraulic dampers and suspension struts.

The piston rod guides of such units are conveniently formed as mouldings of thermoplastics synthetic resin materials, such as glass-filled nylon, and the piston rod seals are secured in position in the guide by a suitable adhesive. However, some hydraulic fluids currently coming into use attack the adhesive, and so some other form of attachment is desired.

In accordance with a feature of the invention, there is provided a piston rod guide and seal assembly, comprising an annular thermoplastics piston rod guide which is formed with an internal recess receiving an annular seal of elastomeric material, the seal being permanently locked in position by an inwardly deformed annular portion of the thermoplastics rod guide adjacent the seal. In such a piston rod guide assembly the seal is preferably held in an axial compressed condition between a shoulder at the inner end of the recess and an annular retainer member in turn restrained against outward axial movement by the inwardly deformed annular portion of the rod guide.

The invention also provides a method of forming a permanent assembly, such as a piston rod guide assembly, comprising a method of forming a permanent assembly, such as a piston rod guide assembly, comprising a thermoplastics element and another element, said method comprising the steps of simultaneously applying ultrasonic energy and mechanical pressure to a portion of the thermoplastics element to soften the portion and upset it into clamping relationship with the other element.

This method enables a secure and permanent joint to be obtained with a degree of strain energy "locked in."

The present invention also provides a tool for carrying out this method comprising an ultrasonic probe having an annular groove formed in the end face thereof for co-operation with said portion of the thermoplastics element, and a skirt extending around the periphery of the groove. The annular groove preferably has a generally arcuate cross-sectioned portion continuous at its outer periphery with the inside surface of the skirt and continuous at its inner periphery with a frusto conical surface extending to meet the end face of the probe.

A presently preferred assembly, and a tool and a method of forming the same are described below, by way of example, with reference to the accompanying drawings in which.

Figure 1:
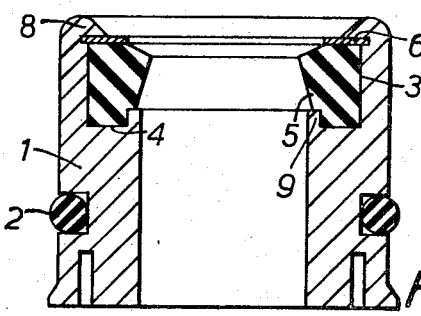
FIG. 1 is an axial cross-section of a piston rod guide assembly in accordance with the invention.

The assembly shown in FIG. 1 comprises a glass-filled nylon piston rod guide 1 having an external peripheral recess to receive an outer seal 2 and an internal recess in the form of a counter bore 3 having at its inner end a spigot 9 and an outwardly facing shoulder 4 against which a piston rod seal 5 is clamped by an annular retainer member in the form of a washer 6 permanently locked in a recess formed between a shallow shoulder 7 (seen more clearly in FIGS. 2 and 3) and an inwardly deformed end portion 8 of the piston rod guide 1. The seal 5 is of elastomeric material and the washer 6 is of metal. In the finished assembly, the seal 5 is held in axially compressed condition by the washer 6 in turn restrained by the end portion 8.

Figure 2:
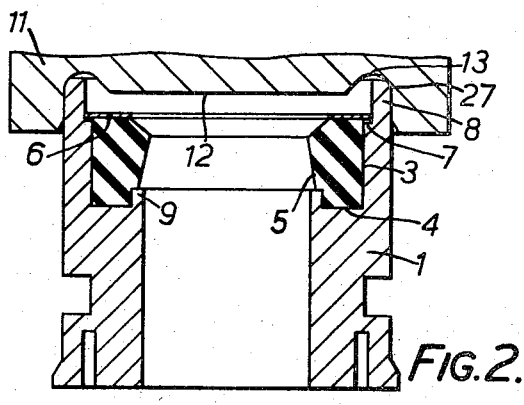
FIGS. 2 and 3 illustrate two stages in the manufacture of the assembly of FIG. 1.
Figure 3:
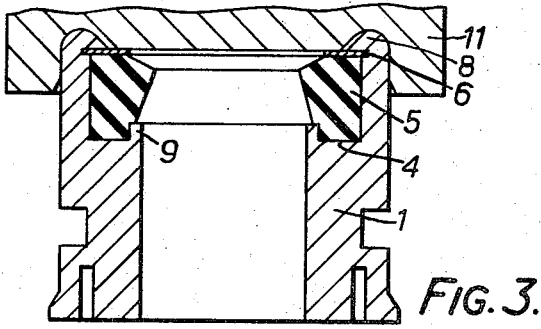
Figure 5:
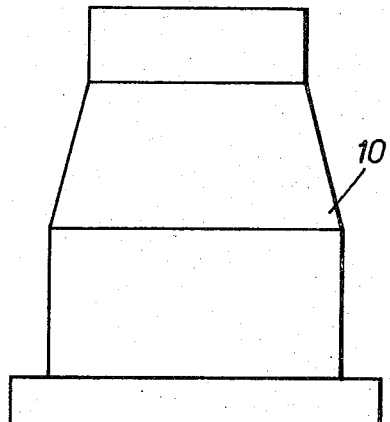
FIG. 5 shows on an enlarged scale, a detail section of part of a groove and skirt at the end of the ultrasonic probe shown in FIG. 4.
Figure 5:
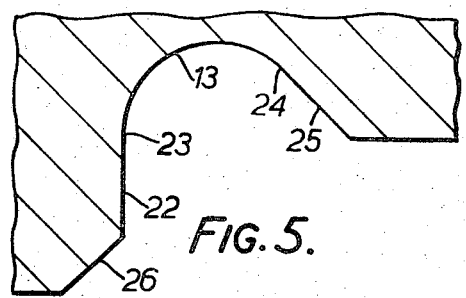
Figure 4:
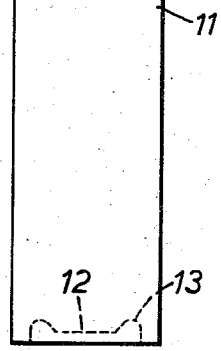
FIG. 4 is a side view of an ultrasonic probe used in such manufacture.

As shown in FIG. 2, the piston rod guide is initially formed with its end portion 8 generally parallel sided, the inner diameter being sufficient to receive the washer 6. The seal 5 is first inserted and pushed home to engage the shoulders 4 and the washer 6 inserted to rest on the outer end of the seal slightly above the outer shoulder 7. The assembly is completed by means of the tool illustrated in FIG. 4, which is a composite assembly of a booster 10 and an ultrasonic probe or sonotrode 11 the lower end 12 of which has a skirt 22 which extends along the periphery of an annular groove 13 of part circular cross section as can be seen in FIG. 5.

FIG. 2 shows the lower, shaped end of the sonotrode engaged with the outer end portion 8 of the rod guide, which is supported on a fixed platten or other surface. The recessed portion of the sonotrode makes a close fit over the outside of the rod guide, and when the power is switched on and the sonotrode moved down the portion 8 is heated ultrasonically and softens, the downward pressure of the sonotrode causing the material to flow inwardly and downwardly over the periphery of the washer. When the confronting face of the lower end 12 of the sonotrode approaches the washer, it presses the material against the washer to force the washer down on to the shoulder 7, against the resilience of the seal 5. When the final position of FIG. 3 has been reached, the power is switched off, allowing the nylon to cool and harden, while the pressure is maintained, thereby substantially or totally eliminating any resilient or elastic recovery of the parts when the pressure is removed. In some cases, however it may be possible to switch off the power and simultaneously remove the sonotrode.

This technique is found to produce a very satisfactory jointing of the parts with a short cycle time and with the homogeneity of the nylon substantially unimpaired, due to the sloping of the probe to induce a smooth flow pattern and due to the nature of the ultrasonic heating techniques, whereas ultrasonic heating normally causes desegregating of the filling from "filled" thermoplastics material. The technique also avoids certain well known difficulties of previously known methods, such as spin (frictional) welding with its long cycle time, and the use of heated pressure forming tools which tend to heat the material in an uneven manner, form an excessive amount of flash, and damage the deformed surface by virtue of particles adhering to the tool.

The annular spigot 9 retains the radially inner edge of the inner end of seal 5 and thereby reduces inward deflection of the seal when the piston rod guide is pressurized and thereby helps prevent the seal engaging pressurizing grooves in the piston rod and jamming it in position. The said inner edge of the seal 5 is held off from the piston rod so that noise and jerky operation are reduced in use. It will be apparent that the spigot 9 would be euqally advantageous for piston rod guide assemblies of aluminium or other materials.

Referring to FIG. 5, the lower end of the sonotrode 11 is provided with a skirt 22 which extends along the periphery of annular groove 13. The annular groove 13 has a generally arcuate cross-sectioned portion which is continuous at its outer periphery 23 with the inside surface of the skirt 22, and is continuous at its inner periphery 24 with a frust-conical surface 25 extending to meet the end face of the sonotrode 11.

The bottom of the skirt 22 is chamfered at 26 and guides the outer end portion 8 of the rod guide into the sonotrode 11 when the latter is lowered. The outer end portion 8 is provided with a co-operating chamfered edge 27 (FIG. 2) which also serves to reduce the thickness of material entering the sonotrode 11 and allows a quick initial melt which reduces cycle time.

Whilst the skirt 22 is preferably a close sliding fit over the piston rod guide 1 an interference fit can also be used. In the latter case the skirt 22 machines the outer surface of the piston rod guide 1 as the sonotrode 11 travels downwards. The skirt length is determined by the energy level at the working face and may be arranged to machine all or any part of the outer surface of the piston rod guide 1.

We claim:

1. A piston rod guide comprising a body having an axial passage therethrough, a counter bore at one end of said passage defining a recess of greater diameter than said passage and having a shoulder at the inner end of said recess, a radially inwardly deformed annular portion integral with the wall of said recess and axially spaced from said shoulder, and an annular seal of elastomeric material received in said recess and permanently locked in position in axially compressed condition between said inwardly deformed portion and said shoulder.

2. An assembly according to claim 1, further comprising an annular retainer member disposed between said seal and said inwardly deformed portion.

3. An assembly according to claim 2, wherein an axially outwardly directed spigot is formed abutting the inner diameter of said shoulder, the inner end of said seal being received between the wall of said recess and the spigot to reduce radially inward deflection of said seal.

4. A piston rod guide assembly comprising an annular piston rod guide including a first portion and a second portion, said first portion having an internal diameter greater than the internal diameter of said second portion to define a shoulder therebetween and a recess, an annular seal received in said recess and having one end seating on said shoulder, and a spigot positioned radially inwardly of and adjacent said shoulder and being axially directed away from said shoulder, whereby to retain said one end of said seal.

* * * * *